United States Patent
Chin

(10) Patent No.: US 8,802,878 B2
(45) Date of Patent: Aug. 12, 2014

(54) PROCESS FOR THE PRODUCTION OF FATTY ACID METHYL ESTERS FROM VARIABLE FEEDSTOCK USING HETEROGENEOUS CATALYSTS

(76) Inventor: Kyent Chin, Los Angeles, CA (US)

(*) Notice: Subject to any disclaimer, the term of this patent is extended or adjusted under 35 U.S.C. 154(b) by 299 days.

(21) Appl. No.: 13/232,517

(22) Filed: Sep. 14, 2011

(65) Prior Publication Data

US 2013/0245300 A1    Sep. 19, 2013

Related U.S. Application Data

(60) Provisional application No. 61/382,839, filed on Sep. 14, 2010.

(51) Int. Cl.
C11B 3/02 (2006.01)
C11C 3/04 (2006.01)

(52) U.S. Cl.
USPC ........... 554/174; 554/169; 554/124; 554/163; 554/170

(58) Field of Classification Search
None
See application file for complete search history.

(56) References Cited

U.S. PATENT DOCUMENTS

| | | | | |
|---|---|---|---|---|
| 4,698,186 A * | 10/1987 | Jeromin et al. | ............... | 554/174 |
| 6,878,837 B2 * | 4/2005 | Bournay et al. | ............... | 554/169 |
| 7,488,837 B2 * | 2/2009 | Tsuto et al. | ................... | 554/169 |
| 7,872,149 B2 * | 1/2011 | Bunning et al. | .............. | 554/169 |
| 8,039,651 B2 * | 10/2011 | Nonoguchi et al. | .......... | 554/124 |
| 2009/0300973 A1 * | 12/2009 | Ashley | ............................ | 44/308 |

FOREIGN PATENT DOCUMENTS

WO WO2008/036287 * 3/2008
WO WO2009/057810 * 5/2009

* cited by examiner

*Primary Examiner* — Yate K Cutliff
(74) *Attorney, Agent, or Firm* — Jonathan Jaech; Novak Druce Connolly Bove + Quigg LLP

(57) ABSTRACT

A process for producing fatty acid methyl esters includes mixing an alcohol with a feedstock oil to prepare an alcohol/oil mixture, then reacting the alcohol/oil mixture using a first heterogeneous catalyst in an acid esterification process to produce a glycerin-containing product. The glycerin is separated from the glycerin-containing product using a coalescer to produce a biodiesel-containing feedstock and glycerin. Biodiesel is separated from the biodiesel-containing feedstock using a coalescer to produce unreacted feedstock and biodiesel. The unreacted feedstock is reacted using a second heterogeneous catalyst in a trans-esterification process to produce a glycerin-biodiesel-methanol mixture. Biodiesel and glycerin are separated in separate streams from the glycerin-biodiesel-methanol mixture, using a coalescer, to produce additional glycerin and additional biodiesel.

11 Claims, 2 Drawing Sheets

PROCESS FOR THE PRODUCTION OF FATTY ACID METHYL ESTERS FROM VARIABLE FEEDSTOCK USING HETEROGENEOUS CATALYSTS

CROSS-REFERENCE TO RELATED APPLICATION

This application claims priority pursuant to 35 U.S.C. §119 (e) to U.S. provisional application Ser. No. 61/382,839, filed Sep. 14, 2010, which is hereby incorporated by reference in its entirety.

BACKGROUND

1. Field

The present disclosure relates to a process for the production of fatty acid methyl esters (e.g., biodiesel), and more particularly to such a process using variable feedstock and heterogeneous catalysts.

2. Description of Related Art

Typical biodiesel production processes are centered on the trans-esterification of low Free Fatty Acid (FFA) lipids. FFA levels vary from 0% in highly refined and treated oils such Soybean or Canola oils to 100% in Coconut oil. When FFA's are present they are saponified (turned into soap) by the trans-esterification reaction and represent a loss in yield unless pre-treated through acid esterification.

Traditional catalysts for acid esterification and base trans-esterification are homogeneous catalysts, which is to say they are in the same phase as the reactants (liquids in this case) and cannot be separated. When acid esterification is used, the acid is neutralized by a base, typically by the base catalyst which may then be used to carry out a base catalyzed trans-esterification reaction. However, the neutralization of the acid creates impurities in the form of salts which for biodiesel applications requires removal from the product stream. In the case where a producer does not use acid esterification to treat the FFA's in their feedstock, the resulting soap may also require removal from the product streams. In either case, time and energy are expended to remove excess catalyst, salts, or soap to obtain a product that may be used as biodiesel. It would be desirable to reduce or eliminate such requirements.

SUMMARY

A process for producing fatty acid methyl esters may include mixing an alcohol (for example, methanol) with a feedstock oil to prepare an alcohol/oil mixture, then reacting the alcohol/oil mixture using a first heterogeneous catalyst in an acid esterification process to produce a glycerin-containing product. The glycerin may be separated from the glycerin-containing product using a coalescer to produce a biodiesel-containing feedstock and glycerin. Biodiesel may be separated from the biodiesel-containing feedstock using a coalescer to produce unreacted feedstock and biodiesel. The unreacted feedstock may be reacted using a second heterogeneous catalyst in a trans-esterification process to produce a glycerin-biodiesel-methanol mixture. Optionally, the process may include mixing the unreacted feedstock with additional alcohol prior to the reacting. In the alternative, or in addition, the process may include heating the unreacted feedstock prior to the reacting. Biodiesel and glycerin may be separated in separate streams from the glycerin-biodiesel-methanol mixture, using a coalescer, to produce additional glycerin and additional biodiesel.

In an aspect, the process may further include producing the feedstock oil from an oily or fatty organic waste product derived from an animal or vegetable source. In another In another aspect, the process may further include recovering excess alcohol from a mixture of the biodiesel and additional biodiesel to prepare an intermediate biodiesel. Accordingly, the process may include separating a second additional glycerin stream from the intermediate biodiesel. In addition, the process may further include polishing the intermediate biodiesel to produce a refined biodiesel. This polishing may be performed using a dry polishing process.

In another aspect of the process, the first heterogeneous catalyst may be, or may include, a heterogeneous strong acid cation catalyst. The second heterogeneous catalyst may be, or may include, a heterogeneous strong base anion catalyst. In a related aspect, all process steps may be free of any use of a homogeneous catalyst.

Advantages of the processes as disclosed herein may include, for example, avoiding any use homogeneous catalysts, thereby avoiding the disadvantages of homogenous catalysts as summarized above. For example, the process may requires less energy to operate the processing equipment because of the use of heterogeneous catalysts. Further energy savings may be realized by the use of coalescers instead of centrifuges to recover heterogeneous catalysts. The process may be used to process variable oily feedstock with FFA ranges from 0% to 100%, and more preferably between about 1% and 100%. The process may produce a cleaner glycerin stream that requires less refining than current methods. Furthermore, the process may produce a cleaner biodiesel stream that requires less refining than current methods.

DETAILED DESCRIPTION

Figure 1:
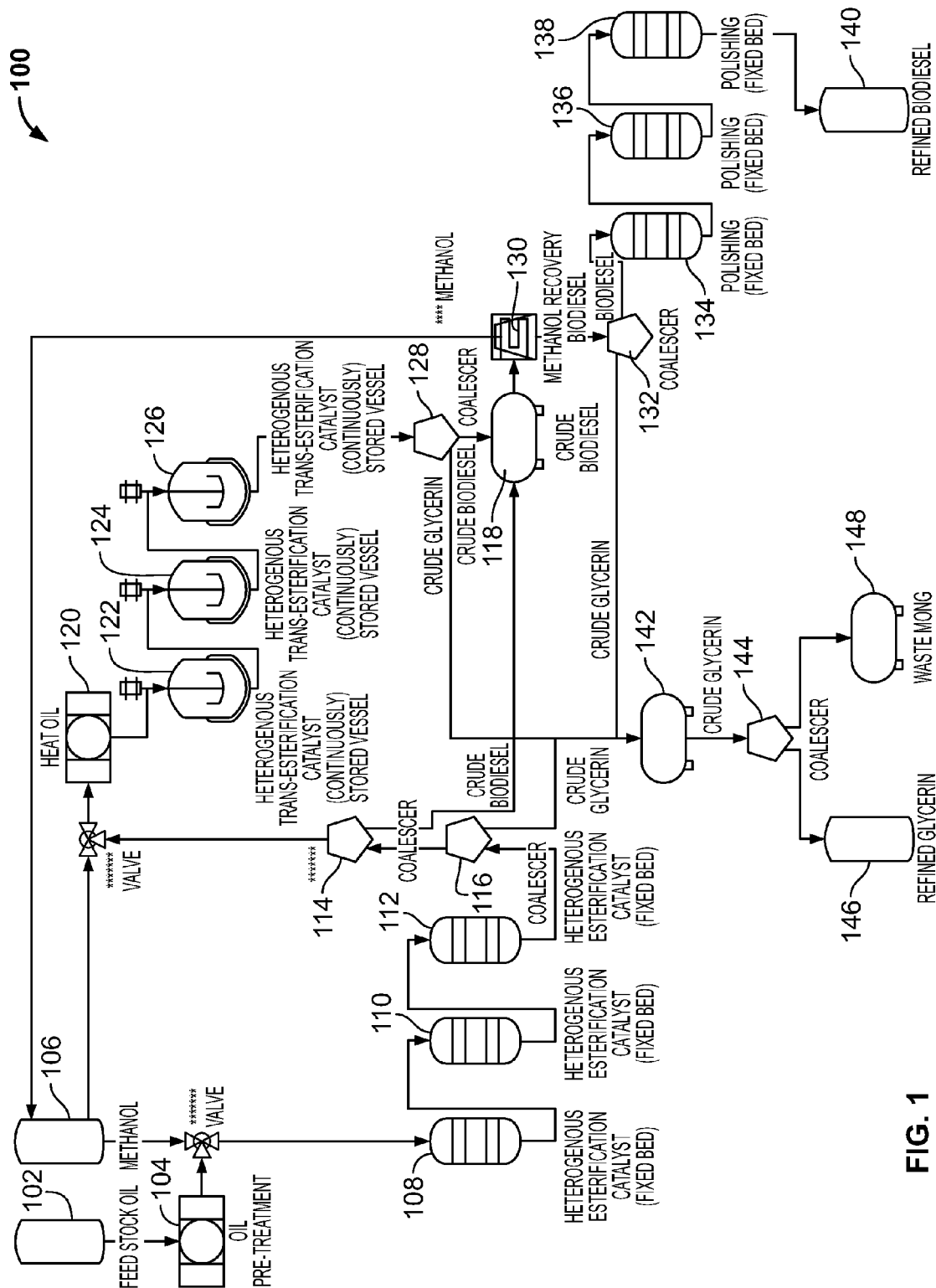
FIG. 1 is a schematic diagram illustrating a system for processing a variable feedstock oil to obtain biodiesel and glycerin.
Figure 2:
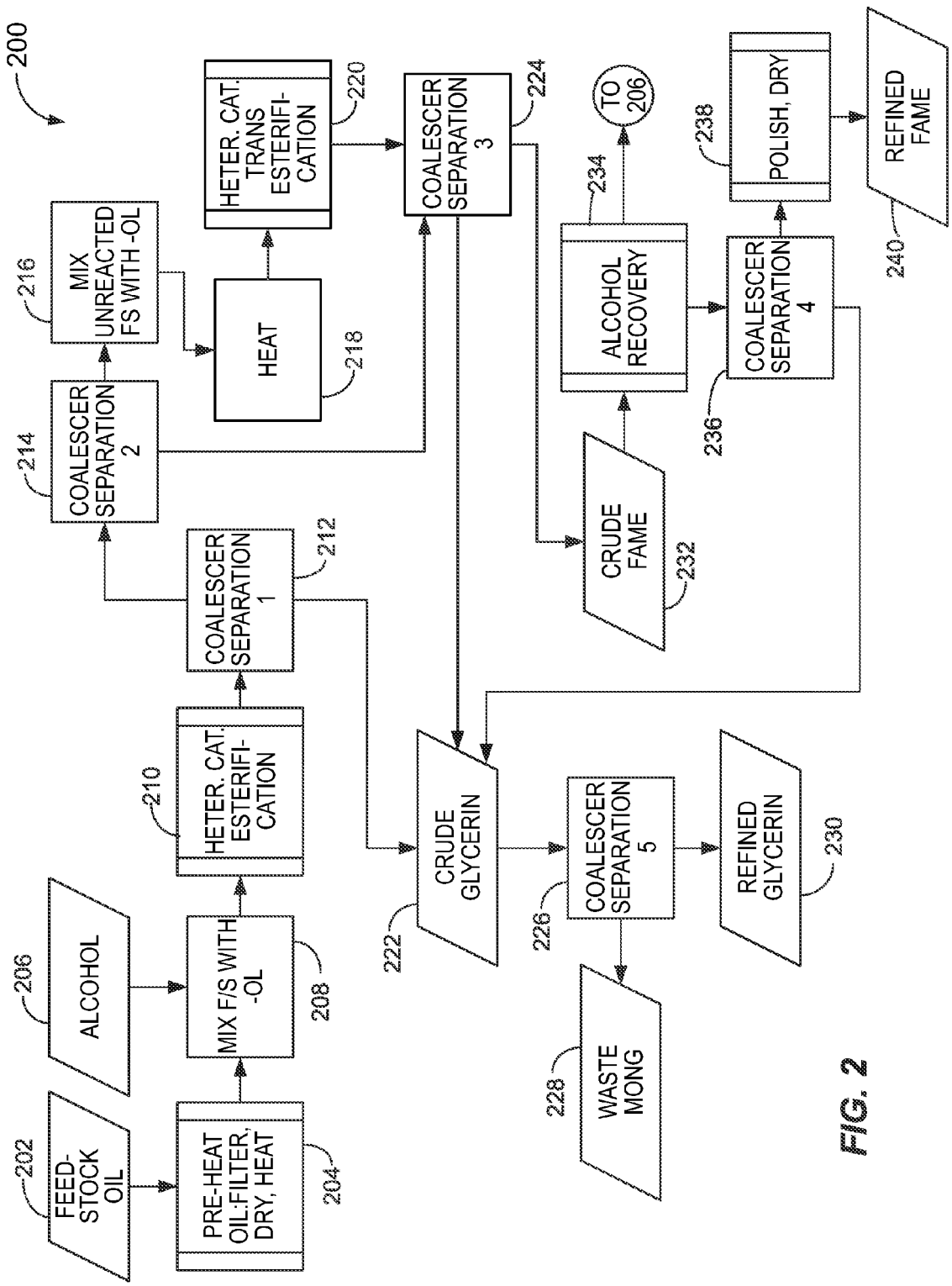
FIG. 2 is a flow diagram illustrating an example of a process flow by which a variable feedstock oil may be converted into biodiesel and glycerin.

A system 100 and process 200 for the production of fatty acid methyl esters from variable feedstock is shown in FIGS. 1 and 2, respectively. The system 100 and process 200 may that use heterogeneous catalysts to perform the acid catalyzed and base catalyzed reactions is disclosed herein. The novel system and process may include a combination of acid esterification 210 using a suitable heterogeneous catalyst together with base esterification 220 using a suitable heterogeneous catalyst, in an integrated process 100. Accordingly, the use of homogeneous catalysts with their accompanying disadvantages in the production of fatty acid methyl esters from variable feedstock may be avoided altogether.

Additionally, this process may utilize coalescers to perform the task of separating various materials normally reserved for centrifuges or gravity separation, for example, the coalescers 114, 116, 128, 132 and 144 shown in system 100 of FIG. 1. These coalescers may be mechanical liquid-liquid coalescers as used in the refining art to separate hydrocarbons from aqueous liquids. Corresponding coalescing operations 212, 214, 224, 226, and 236 are depicted in the process 100 of FIG. 2. Coalescers offer the advantages of speed and compact size over gravity separation and energy efficiency and low maintenance over centrifuges.

Using the multiple coalescers, the system 200 and process 100 may perform several more product separations than conventional processes. Reactions in the process 100, as with any chemical reaction, proceed in a manner until equilibrium is established. By frequently removing products, the reaction dynamics may be shifted towards the production of more products at an increased rate.

The benefits of the disclosed system 100 and process 200 may include lower equipment costs resulting from the use of non-corrosion resistant materials because the use non-corrosive catalysts do not necessitate it. A further benefit may include the production of product streams requiring significantly less refinement to meet ASTM or EIN specifications, because there are no excess catalysts that need to be treated or impurities (salts) present from the neutralization of catalysts. Use of the process may enable reduction of operating costs related to the use of non-hazardous catalysts which do not require special handling or storage procedures as compared to soluble acids and bases, and the use of low maintenance coalescers which have no moving parts and do not require frequent maintenance schedules.

The catalyst for the acid esterification step 210 may be a heterogeneous strong acid cation catalyst, for example, an insoluble polymeric strong acid catalyst. The acid esterification operation 210 may be performed using a series of fixed bed heterogeneous esterification catalyst beds 108, 110, 112 receiving a pretreated feedstock from a crude feedstock reservoir 102 passed through a pretreatment processor 104 and mixed with an alcohol (e.g., methanol) provided 206 from an alcohol reservoir 106 via a mixing valve. The catalyst for the base trans-esterification step may be a heterogeneous strong base anion catalyst, for example, an insoluble polymeric strong base catalyst. The base trans-esterification operation 210 may be performed using a series of fixed bed heterogeneous trans-esterification catalyst beds 122, 124 and 126 receiving unreacted (recovered) feedstock oil from the coalescer 114 and alcohol from the reservoir 106 mixed via an intervening mixing valve. The method of containment for the heterogenous catalyst may follow manufacturer's recommendation.

The feedstock 102 may be provided 202 to a pre-treatment unit 104, which may perform a pretreatment process 204 including filtering, drying and heating until MIU is less than a desired threshold (e.g., less than 2%), the moisture content is less than a separate defined threshold (e.g., below 1%), and there are no impurities above a third threshold (e.g. greater than 50 microns). More extensive filtration, for example to exclude impurities greater than 5 microns may be preferred or required, depending on the intended application.

In addition, the feedstock may be heated 204 in the unit 104 to a temperature required in order to achieve a flow rate as recommended by the catalyst manufacturer for the catalyst used in the reaction vessels 108, 110, 112. In general, the feedstock viscosity decreases, and flow rate therefore increases, in proportion to temperature depending on the average molecular weight and other properties of the feedstock. One of ordinary skill may determine an optimal temperature and quantity of heating required for a particular feedstock and heterogeneous catalyst in use.

After pretreatment including filtration, drying and heating 204, methanol or other alcohol may be mixed 208 with the feedstock oil, for example, using a mixing valve as shown in system 100. This mixture may be sent to the acid esterification reaction vessels 108, 110, 112. Again the flow rate may be as specified by the catalyst manufacturer. The acid esterification process 210 using the heterogenous catalyst may produce crude fatty acid methyl esters (FAME) and crude glycerin. Multiple reaction vessels 108, 110, 112 may be used in order to achieve the production volumes required.

The resulting FAME/glycerin product stream from the reaction vessels may be sent to a coalescer 116 for performing a first coalescing process 212 to separate the crude glycerin product from the rest of the product stream. It is anticipated that the input to the first coalescer 116 will include some substantial proportion of unreacted feedstock. The first coalescer may separate the product stream into a crude glycerin stream and a mixed FAME/unreacted feedstock stream. The crude glycerin stream may be sent to the crude glycerin storage unit 142 to be held 222 until further processing.

The other product stream from the first coalescer 116, comprising mixed FAME and unreacted feedstock which has had the glycerin removed from it, may now be provided to a second coalescer 114 to separate the crude biodiesel from unreacted feedstock using a second coalescing process 214. The second coalescing process 214 may produce a crude biodiesel output stream and a separate unreacted feedstock steam. The crude biodiesel stream may be sent to the crude biodiesel storage unit 118 to be held 232 for further processing.

The second product stream from the second coalescer 114 should now contain only (or primarily) the unreacted feedstock oil, possible including residual methanol. As shown at 216, the unreacted feedstock may be mixed with the desired amount of methanol to obtain a feedstock oil mixture, using a mixing valve. After mixing it may be necessary to heat 218 the feedstock oil mixture in order to achieve the desired flow rate required by the trans-esterification catalyst, using a pretreatment unit 120. The heated feedstock mixture may be provided to the trans-esterification reaction vessels 122, 124. 126 for performing a base trans-esterification process 220. Multiple reaction vessels may be employed in order to achieve the production volumes required.

The resultant product stream from the trans-esterification process 220 may now include crude biodiesel, crude glycerin and excess methanol. This resultant product stream may be sent to a third coalescer 128 performing a coalescing process 224 to separate the crude glycerin from the biodiesel and methanol product stream. The crude glycerin stream may be sent to the crude glycerin storage unit 142 to be accumulated and held 222 for further processing. The crude biodiesel stream may be sent to the crude biodiesel storage 118 to be held 232 for further processing 234 for recovery of residual methanol.

From the crude biodiesel storage 118, biodiesel may be sent to the methanol recovery unit 130. Any suitable method and equipment may be utilized in process 234 for methanol recovery, as known to one of ordinary skill in the art. The resultant methanol stream may be returned to methanol storage 106, 206 to be recycled for treating more feedstock.

The resultant biodiesel product stream from the methanol recovery unit 130 performing the recovery process 234 may be sent to a fourth coalescer 132 performing a coalescing process 236 to separate any remaining crude glycerin from the crude biodiesel. The crude glycerin stream from the coalescer 132 may be sent to the crude glycerin storage 142 to be held 222 for further processing.

The crude biodiesel stream from the fourth coalescer 132 performing a coalescing process 236 may be provided to the biodiesel polishing units 134, 136, 138 performing any suitable drying and polishing process 238 as known in the art. One of ordinary skill in the art may use any suitable methods and equipment for drying and polishing 238 the crude FAME to produce refined FAME/biodiesel output at 240. A dry polishing method, as opposed to water washing, may be preferable. The resulting refined biodiesel may be sent to a storage unit 140.

From the crude glycerin storage unit 142, glycerin may be provided to a fifth coalescer 144 performing a coalescing process 226 to separate refined glycerin from waste MONG (Matter Organic Non-Glycerol). In the alternative, the crude glycerin may be refined by any suitable alternate method as known in the art. The resulting refined glycerin may be provided to a storage unit 146. The resulting waste MONG may be accumulated and held 228 in a storage unit 148 until disposal as a first byproduct. The refined glycerin may be provided to the glycerin storage unit 146, where it may be accumulated and held 230 until disposal as a second byproduct. Thus, the system 100 and process 200 may be used to convert an input of variable feedstock oils and methanol into refined biodiesel, refined glycerin, and MONG outputs for any suitable application. Residual methanol may be recovered and reused, while the heterogeneous catalysts are not consumed. However, the catalysts may lose effectiveness over time and need to be replaced.

Having thus described an embodiment of a process for the production of fatty acid methyl esters (e.g., biodiesel) using variable feedstock and heterogeneous catalysts, it should be apparent to those skilled in the art that certain advantages of the within system have been achieved. It should also be appreciated that various modifications, adaptations, and alternative embodiments thereof may be made without departing from the scope and spirit of the present technology. The scope of what is claimed should be determined by the appended claims interpreted in accordance with the foregoing specification, and is not limited by the examples hereinabove.

What is claimed is:

1. A process for producing fatty acid methyl esters, comprising:
    mixing an alcohol with a feedstock oil to prepare an alcohol/oil mixture;
    reacting the alcohol/oil mixture in an acid esterification process catalyzed by a first heterogeneous catalyst, thereby producing a glycerin-containing product free of homogenous catalyst;
    separating glycerin from the glycerin-containing product by a coalescer, thereby producing a biodiesel-containing feedstock and glycerin;
    separating biodiesel from the biodiesel-containing feedstock by a coalescer, thereby producing unreacted feedstock and biodiesel;
    reacting the unreacted feedstock using a second heterogeneous catalyst in a trans-esterification process catalyzed by a second heterogeneous catalyst, thereby producing a glycerin-biodiesel-methanol mixture free of homogenous catalyst;
    separating biodiesel and glycerin in separate streams from the glycerin-biodiesel-methanol mixture by a coalescer, thereby producing additional glycerin and additional biodiesel; and
    wherein all process steps are free of any homogeneous catalyst.

2. The process of claim 1, further comprising producing the feedstock oil from an oily or fatty organic waste product derived from an animal or vegetable source.

3. The process of claim 1, wherein the alcohol comprises methanol.

4. The process of claim 1, further comprising recovering excess alcohol from a mixture of the biodiesel and additional biodiesel to prepare an intermediate biodiesel.

5. The process of claim 4, further comprising separating a second additional glycerin stream from the intermediate biodiesel.

6. The process of claim 4, further comprising polishing the intermediate biodiesel to produce a refined biodiesel.

7. The process of claim 6, wherein polishing is performed using a dry polishing process.

8. The process of claim 1, further comprising mixing the unreacted feedstock with additional alcohol prior to reacting thereof.

9. The process of claim 1, further comprising heating the unreacted feedstock prior to reacting thereof.

10. The process of claim 1, wherein the first heterogeneous catalyst comprises a heterogeneous strong acid cation catalyst.

11. The process of claim 1, wherein the second heterogeneous catalyst comprises a heterogeneous strong base anion catalyst.

* * * * *